United States Patent
Li et al.

(10) Patent No.: US 11,257,029 B2
(45) Date of Patent: *Feb. 22, 2022

(54) PICKUP ARTICLE COGNITIVE FITMENT

(71) Applicant: International Business Machines Corporation, Armonk, NY (US)

(72) Inventors: Jialin Li, Westford, MA (US); Pradeep K. Nanjundaswamy, Bangalore (IN); Srikanth Sundararajan, Cambridge, MA (US); Danai Tengtrakool, Burlington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/563,846

(22) Filed: Sep. 7, 2019

(65) Prior Publication Data

US 2019/0392012 A1 Dec. 26, 2019

Related U.S. Application Data

(63) Continuation of application No. 15/473,910, filed on Mar. 30, 2017, now Pat. No. 10,552,502.

(51) Int. Cl.
*G06F 16/58* (2019.01)
*G06F 16/583* (2019.01)
(Continued)

(52) U.S. Cl.
CPC ......... *G06Q 10/0836* (2013.01); *G06F 16/58* (2019.01); *G06F 16/5854* (2019.01);
(Continued)

(58) Field of Classification Search
CPC .. G06F 16/58; G06F 16/5854; G06F 16/9535; G06F 17/2247; G06F 17/243;
(Continued)

(56) References Cited

U.S. PATENT DOCUMENTS 8,560,406 B1 10/2013 Antony
9,544,552 B2 1/2017 Takahashi et al.
(Continued)

FOREIGN PATENT DOCUMENTS

GB 2539030 12/2016

OTHER PUBLICATIONS

Mell, Peter, et al., "The NIST Definition of Cloud Computing". NIST Special Publication 800-145, Sep. 2011, Gaithersburg, MD, 7 pgs.
(Continued)

*Primary Examiner* — James E Richardson
(74) *Attorney, Agent, or Firm* — Stephanie Carusillo; George S. Blasiak; Heslin Rothenberg Farley & Mesiti PC

(57) ABSTRACT

Methods, computer program products, and systems are presented. The method computer program products, and systems can include, for instance: obtaining a request for in venue pickup of an article by a customer user, the request specifying an article identifier for the article; obtaining from a data repository article dimensional information of the article; evaluating loading of the article into a transport apparatus associated to the customer user based on the article dimensional information and transport apparatus dimensional information of the transport apparatus; and outputting a notification to the customer user based on the evaluating.

20 Claims, 9 Drawing Sheets

(51) Int. Cl.
*G06Q 10/08* (2012.01)
*G06N 20/00* (2019.01)
*G06F 16/9535* (2019.01)
*G06Q 30/06* (2012.01)
*G06F 40/14* (2020.01)
*G06F 40/174* (2020.01)
*G01B 11/02* (2006.01)

(52) U.S. Cl.
CPC .......... *G06F 16/9535* (2019.01); *G06F 40/14* (2020.01); *G06F 40/174* (2020.01); *G06N 20/00* (2019.01); *G06Q 30/0603* (2013.01); *G06Q 30/0641* (2013.01); *G01B 11/02* (2013.01)

(58) Field of Classification Search
CPC ........ G06N 20/00; G01B 11/02; G06Q 50/28; G06Q 50/30; G06Q 10/08; G06Q 30/0603; G06Q 30/0641
See application file for complete search history.

(56) References Cited

U.S. PATENT DOCUMENTS

| | | |
|---|---|---|
| 9,626,639 B2 * | 4/2017 | Gibbon ................ G06Q 10/083 |
| 10,095,197 B1 | 10/2018 | Li et al. |
| 2006/0161345 A1 | 7/2006 | Mishima |
| 2011/0078182 A1 | 3/2011 | Fenyes |
| 2012/0053785 A1 | 3/2012 | Wittorf |
| 2012/0259509 A1 | 10/2012 | Wittorf |
| 2014/0019377 A1 | 1/2014 | Bhaumik et al. |
| 2014/0279238 A1 | 9/2014 | Jones et al. |
| 2014/0279658 A1 | 9/2014 | Lievens et al. |
| 2015/0012602 A1 | 4/2015 | Huffman et al. |
| 2015/0094876 A1 | 4/2015 | Baldwin |
| 2015/0154548 A1 | 6/2015 | Skaaksrud |
| 2015/0227882 A1 | 8/2015 | Bhatt et al. |
| 2016/0148300 A1 | 5/2016 | Carr et al. |
| 2016/0247113 A1 | 8/2016 | Rademaker |
| 2017/0349166 A1 | 12/2017 | Anderson |

OTHER PUBLICATIONS

List of IBM Patent and/or Patent Applications treaded as related for U.S. Appl. No. 16/563,864, filed Sep. 7, 2019, dated Dec. 17, 2019.
Report by Applicant summarizing considered art of the parent application, Dec. 29, 2021, 3 pgs.

* cited by examiner

PICKUP ARTICLE COGNITIVE FITMENT

CROSS-REFERENCE TO RELATED APPLICATION

This application is a continuation of U.S. application Ser. No. 15/473,910, filed Mar. 30, 2017, entitled "Pickup Article Cognitive Fitment", which is incorporated by reference herein in its entirety.

BACKGROUND

With traditional retail store shopping experiences, a customer selects items at a retail venue by placing them in a shopping cart. The customer moves around the retail venue with the items selected while looking for other items that they also may purchase. When the customer is ready to purchase the selected items, the customer moves to a location of a point of sale terminal. The customer then purchases the items at this point of sale terminal.

In some cases, a customer may wish to purchase more items than can reasonably be purchased using a traditional retail shopping experience at a brick and mortar store. For example, a customer may desire to purchase more items than can be carried in a shopping cart in the retail venue. As another example, the customer may not have sufficient room at home to retail venue items that are purchased from the retail venue.

Retail venues, on occasion, offer customers discounted prices for bulk purchases. Bulk purchasing benefits both the retailer, who makes more sales, and the customer who gets a discounted price. However, customers placing a limited number of items of a particular type in their shopping cart may not be aware of a bulk price offer for the item. Additionally, even if the customer is aware of the bulk price, the customer may choose to ignore the bulk price offer due to limited storage, product expiration dates, and other factors.

One current approach to improving the retail venue shopping experience includes having retail venue clerks offer shipping to customers for large and heavy items. These items may be, for example, furniture and appliances. This approach is limited in a number of ways. For example, a sufficient number of retail venue clerks may not be available to do the work of setting up the shipping of the items. As another example, the additional time spent by retail venue clerks setting up the shipping of the items may be undesirable when compared to time the retail venue clerks spend on other tasks.

Another approach to improving the retail venue shopping experience includes having a customer purchase an item for pickup at the retail venue. For example, when a large or expensive item is selected, a customer may be directed by the retail venue to pick up the item at a specified location of the store. For example, the customer may be directed to pickup and purchase an item at a customer service desk at the retail venue. As another example, the customer may be directed to collect the item, after purchase, at a location of the retail venue suited for pickup of large items. In some cases, selecting items to purchase may be limited to in-venue pickup at the time of purchase.

SUMMARY

Shortcomings of the prior art are overcome, and additional advantages are provided, through the provision, in one aspect, of a method. The method can include, for example: obtaining a request for in venue pickup of an article by a customer user, the request specifying an article identifier for the article; obtaining from a data repository article dimensional information of the article; evaluating loading of the article into a transport apparatus associated to the customer user based on the article dimensional information and transport apparatus dimensional information of the transport apparatus; and outputting a notification to the customer user based on the evaluating.

In another aspect, a computer program product can be provided. The computer program product can include a computer readable storage medium readable by one or more processing unit and storing instructions for execution by one or more processor for performing a method. The method can include, for example: obtaining a request for in venue pickup of an article by a customer user, the request specifying an article identifier for the article; obtaining from a data repository article dimensional information of the article; evaluating loading of the article into a transport apparatus associated to the customer user based on the article dimensional information and transport apparatus dimensional information of the transport apparatus; and outputting a notification to the customer user based on the evaluating.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining a request for in venue pickup of an article by a customer user, the request specifying an article identifier for the article; obtaining from a data repository article dimensional information of the article; evaluating loading of the article into a transport apparatus associated to the customer user based on the article dimensional information and transport apparatus dimensional information of the transport apparatus; and outputting a notification to the customer user based on the evaluating.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
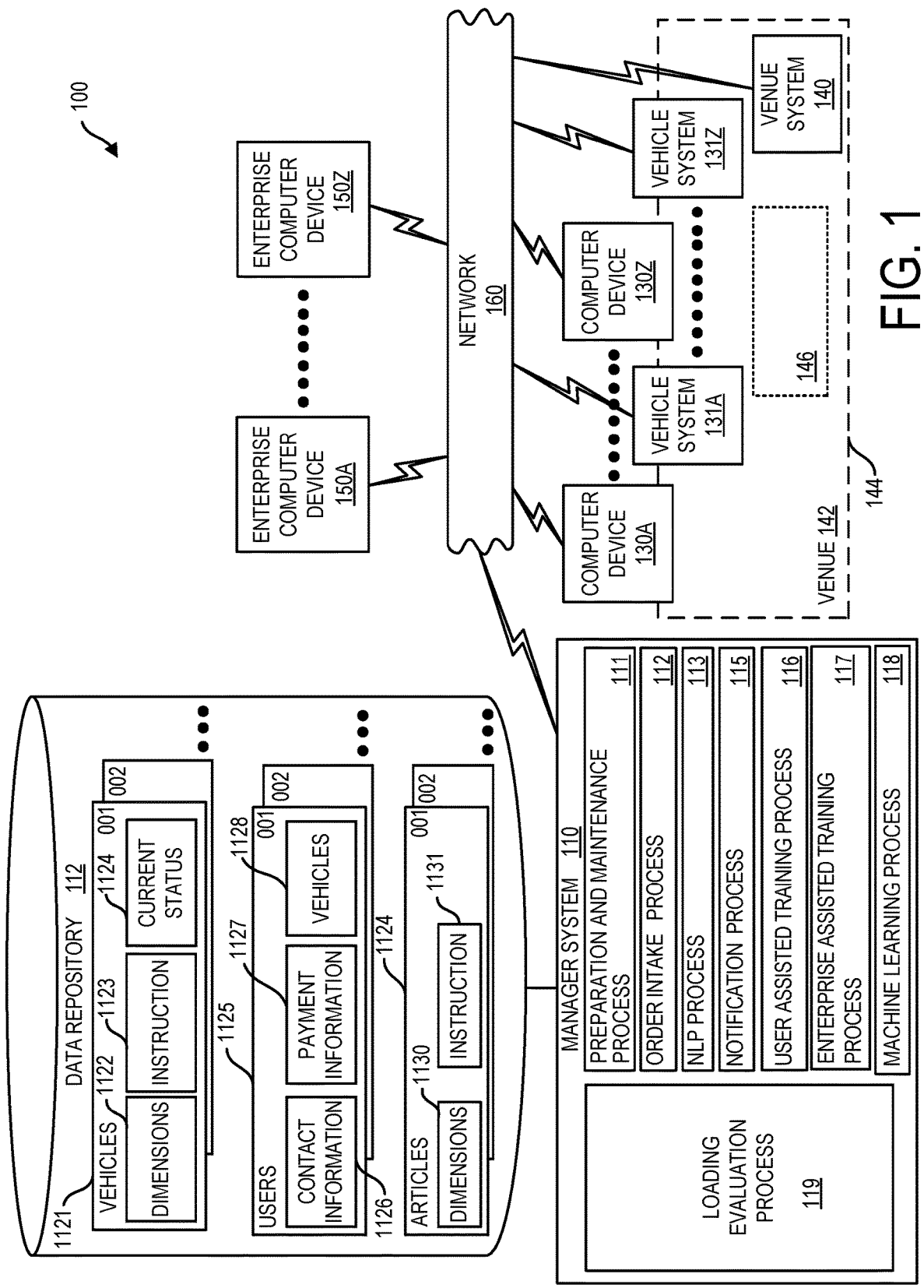
FIG. 1 depicts a system having manager system in one embodiment.

Referring to FIG. 1 there is set forth a system 100 for use and support of providing assistance to users in loading articles into transport apparatus which can be provided e.g. by vehicles. In one embodiment, system 100 can include manager system 110 having an associated data repository 112, a plurality of computer devices 130A-130Z to which can be associated with a different user, a plurality of transport apparatus system e.g. which can be provided by vehicle systems 131A-131Z each of which can be associated with a certain user, a venue system 140 disposed in a retail venue 142 which can be located in a particular geographical area indicated by border 144. Retail venue 142 can include a transport apparatus loading area e.g. which can be provided by vehicle loading area 146, a location wherein articles for in-venue pickup can be loaded into a transport apparatus. System 100 can also include a plurality of enterprise computer devices 150A-150Z which can be used by enterprise personnel and which can also be referred to as enterprise personnel user computer devices. The systems and devices shown in FIG. 1 can be in communication with one another via network 160. Computer devices 130A-130Z and vehicle systems 131A-131Z can transition from locations internal and external to venue 142 and thus are shown as being partially internal to border 144 defining retail venue 142. Enterprise computer devices 150Z are shown as being external to venue 142 defined by border 144, but can also be used within venue 142.

Manager system 110, computer devices 130A-130Z, vehicle systems 131A-131Z and a venue system 140 can be computing node based devices in communication with one another via communication via network 160. For example, network 160 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

In one embodiment manager system 110 can be external to venue system 140 and to each of the one or more user computer device 130A-130Z, 150A-150Z. In one embodiment manager system 110 can be co-located with venue system 140. In one embodiment manager system 110 can be co-located with each of the one or more computer device 130A-130Z, 150A-150Z. Regarding one or more user computer device 130A-130Z a computer device of one or more user computer device 130A-130Z in one embodiment can be a computing node based device provided by a client computer, e.g. a mobile device, e.g. a smartphone or tablet, a laptop or PC that runs one or more program including a web browser for browsing web pages. Regarding one or more enterprise computer device 150A-150Z for use by personnel of an enterprise organizational entity that operates manager system 110 and venue 144 a computer device of one or more enterprise computer device 150A-150Z in one embodiment can be a computing node based device provided by a client computer, e.g. a mobile device, e.g. a smartphone or tablet, a laptop or PC that runs one or more program including a web browser for browsing web pages.

Preparation and maintenance process 111 can populate data of data repository 112 and maintain data of data repository 112 for use by other processes run by manager system 110, such as loading evaluation process 119 as is described further herein. Manager system 110 can run an order intake process 113 for intake of orders of customer users. In one aspect, such customer orders can include requests for in-venue pickup of items for purchase. Manager system 110 can also run natural language processing (NLP process) 114. NLP process 114 can subject various data obtained by manager system 110 for structuring such data. In one aspect, NLP process 114 can convert voice samples to text based data. In another aspect, NLP process 114 can process text data (data received in text for or converted from voice to text) to determine classifications for segments of the data to tag incoming data. Classification processes that can be performed by NLP process 114 can include e.g. topic classification and/or sentiment classification. Manager system 110 can also run notification process 115 for providing notifications to customer users. Manager system 110 can also run a user-assisted training process 116 for guiding a customer user in a process for populating data repository 112 with useful training data such as training data in the form of dimensional data of vehicles. Manager system 110 can also run the enterprise-assisted training process 117 which process can guide enterprise personnel in a process for populating data repository 112 with useful training data such as training data in the form of dimensional data of vehicles and articles. Manager system 110 can run machine learning process 118 which can record results data resulting from implemented processes, which results data can be referenced for purposes of improving accuracy of processes run by manager system 110. Manager system 110 can run can run loading evaluation process 119 to perform evaluation of loading of an article into a vehicle to determine fitment of the article into a vehicle.

Data repository 112 can store various data for use in supporting various processes of manager system 110. In area 1122 data repository 112 can store vehicle data of vehicles such as vehicle 001, vehicle 002, and numerous additional vehicles. In users area 1125 data repository 112 can store data on various users of manager system 110, such as user 001, user 002, and numerous additional users. In area 1129 data repository 112 can store data on various articles such as articles 001, articles 002, and numerous additional articles. In vehicles area 1122 there can be stored dimensional information for each record which can include information on dimensions of one or more article accommodating storage area of the vehicle specified by the vehicle identifier e.g. 001, 002, etc. Article accommodating storage area can be provided e.g. by a trunk of a vehicle. In area 1123 there can be stored for each vehicle identifier, instruction information. Instruction information can include information on how an article can be loaded into storage area of the vehicle. Instruction information can include multiple sets of instructions, each segment corresponding to a different article-type identifier. In other words, there can be provided a first set of instructions for a first article type, a second set of instructions for a second article type, a third set of instructions for a third article type, etc. The article types can be classified according to dimensions of the various articles. In vehicles area 1122 there can be stored identifiers e.g. 001, 002, etc. for vehicle types e.g. make and year and/or identifiers for certain specific vehicles e.g. as are typically identified by VIN numbers. In area 1124 there can be stored data on the current level of loading of the vehicle where the identifier for the vehicle identifies a certain vehicle e.g. for example in area 1124 there can be stored data indicating whether a certain storage area of a vehicle is filled with objects.

In one embodiment, manager system 110 can examine camera image data output by a camera of vehicle system 131A for determining current loading status of vehicle system 131A. In contact information area 1126 of users area 1125, data repository 112 can store contact information for a user. In payment information area 1127 of users area 1125 data repository 112 can store payment information of a user e.g. credit card information associated with the user and in vehicles area 1128 of users area 1125 data repository can specify vehicle identifiers for vehicles associated with a user. Records in areas 1126-1128 can be stored for a plurality of users. In articles area 1129 data repository 112 can store various information on articles 001, 002 etc. available according to inventory of a business enterprise, e.g. provides by articles for purchase. Articles information for each of a plurality of articles can include in area 1130 dimensional information of an article.

Figure 2:
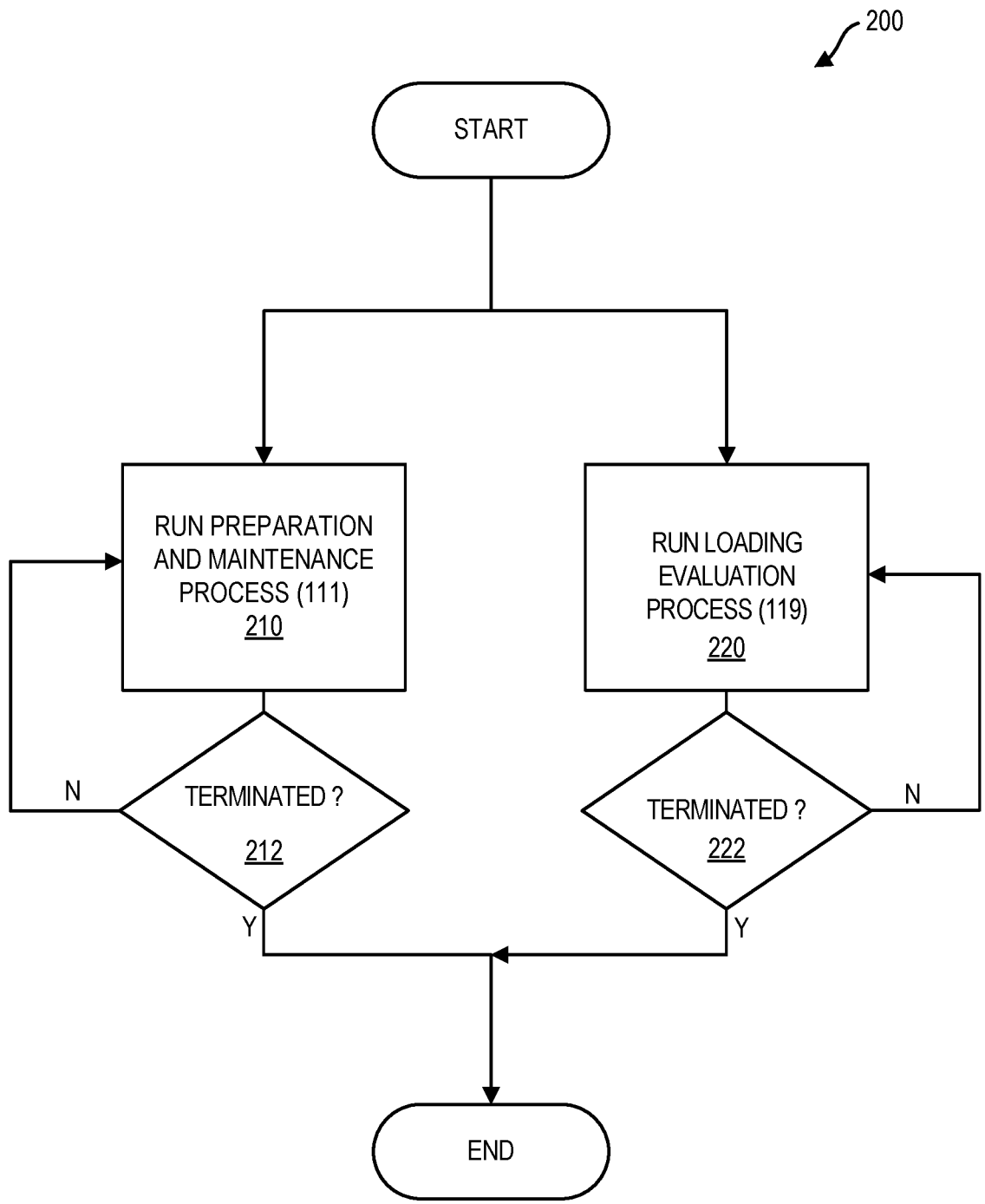
FIG. 2 is a flowchart for use in evaluating loading of an article into a vehicle in one embodiment.

FIG. 2 is a flowchart illustrating a method 200 that can be performed by manager system 210. At block 210, manager system 110 can run preparation and maintenance process 111 to populate prepare and maintain various data of data repository 112 for use by manager system 110 in running various processes including loading evaluation process 119. Manager system 110 can run preparation and maintenance process 111 to populate prepare and maintain various data of data repository 112 including data of vehicles area 1121, users area 1125, and articles area 1129. Manager system 110 can run preparation and maintenance process 111 iteratively until process 111 is terminated at block 212.

At block 220, manager system 110 can run loading evaluation process 119 to perform loading evaluation of an article with respect to a vehicle. Manager system 110 can run loading evaluation process 119 iteratively until process 119 is terminated at block 222. Manager system 110 can run preparation and maintenance process 111 and loading evaluation process 119 concurrently and can run each of process 111 and process 119 iteratively.

For performance of preparation and maintenance process 111, manager system 110 can be configured to automatically process, e.g. by running of NLP process 114, messages received by the organizational entity operating manager system 110. For example, manager system 110 for populating data into vehicles area 1121 and articles area 1124 can be configured to request and receive messages from various data sources respecting vehicles and articles. Such messages can include e.g. descriptive content, e.g. product specification, user manual and instruction manual documents, from suppliers of vehicles that can be registered into manager system 110, and from suppliers of articles available for purchase and loading into a vehicle. Such messages can also include e.g. descriptive content, e.g. product (vehicle or article) review postings from publicly accessible websites such as product review websites and social media websites.

On receipt of messages specifying information of vehicles manager system 110 can run NLP process 114 to determine one or more topic classifier for the vehicle. On receipt of messages manager system 1110 can tag sections of descriptive content messages relating to storage area dimensions can extract dimensional information from such sections, and can store vehicle dimensional information in area 1123. Manager system 110 based the performed topic tagging performed with respect to received message data identify and parse descriptive text sections of received message data providing instructional description of loading of articles into the vehicle and can store such text sections in instructions area 1123.

On receipt of messages specifying information of articles manager system 110 can run NLP process 114 to determine one or more topic classifier for a the article available for purchase and pickup. On receipt of messages manager system 1110 can tag sections of descriptive content messages relating to article dimensions and can extract dimensional information from such sections, and can store article dimensional information in area 1131. Manager system 110 based the performed topic tagging performed with respect to received message data can identify and parse descriptive text sections of received message data providing instructional description of loading of an article into a vehicle and can store such text sections in instructions area 1131.

Figure 3:
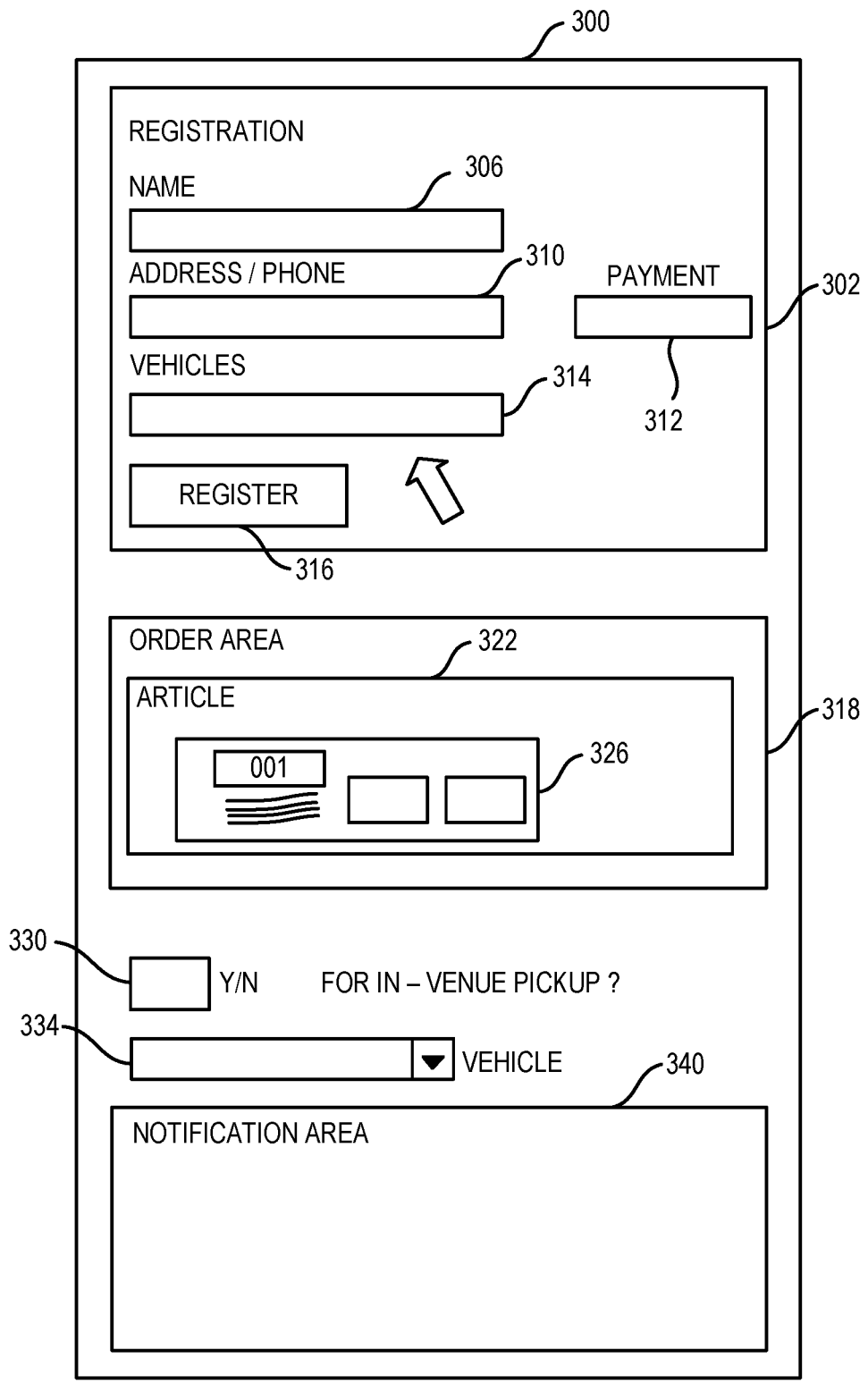
FIG. 3 depicts a user interface for use in defining an order for in venue pickup in one embodiment.

Manager system 110 for populating data into area 1125 can be configured to automatically receive messages from various data sources such as a web server of manager system 110 that serves web pages providing a registration user interface 300 as set forth in reference to FIG. 3.

In one embodiment manager system 110 for performance of block 210 can instantiate structured data records in areas 1121, 1125, and 1129 that are adapted for use by loading evaluation process 119. Structured data records can be stored in data repository 112 in association with or independent of underlying message data processed to generate structured data. A structured data record for a vehicle stored in the vehicles area can have a specific identifier e.g. VID=[VIN number] (where the record is generated by processing message data specifying a unique vehicle identifier provided by a VIN number) and/or one or more general identifier, for example VID=[makeyear] where the general identifier provides an identifier of make and year for the vehicle, or GID=[classification] where a general identifier provides a classification of the National Highway Traffic Safety Administration (NHTSA), or another common classification, e.g. according to the Federal Highway Administration (FHA) or United States Environmental Protection Agency (USEPA). Such identifiers serve as indexes to facilitate searching of data records. A structured data record stored in article area 1129 can have a specific identifier e.g. AID=[serial number] where the record is generated by processing message data specifying a unique article identifier and one or more general identifier for the article. Such identifiers serve as indexes to facilitate searching of data records. Manager system 110 for running loading evaluation process 119 can search for records specifying specific identifiers of vehicles and articles and can use records specifying matching general identifiers if the records specifying specific identifiers are not sufficient or if specific identifiers for a vehicle and/or an article are not included with a request.

In one embodiment, data repository 112 can be configured to initialize responsively to being populated with a threshold amount of data having specified attributes.

Referring to FIG. 3, there is shown a user interface 300 that can be used by a customer user to order articles for purchase, to specify in venue pickup, and register a customer as a registered user of manager system 110. In area 306 the customer user can enter name information of the customer user, in area 310 the customer user can enter address and phone information of a customer user (e.g. including physical address information and digital address information such as email address and social media account information), in area 312 a user can enter payment (e.g. credit card information) and in area 314 the customer user can specify identifiers for vehicles associated to a customer user who is defining registration information. A customer user can activate button 316 to activate registration processes. Using area 314, more than one vehicle can be specified. In addition, dropdown menus can be provided in area 314 e.g. as to make, year of cars to aide a user in the registration of a vehicle. In addition, as is set forth herein a user can be provided with a user interface 300 to permit auto registration of a vehicle e.g. using scan imaging of a vehicle of a user. Using area 318 of user interface 300, which can be displayed on a display of a user computer device e.g. computer device 130A, there can be displayed an order area. A user can use order area 318 to define purchase orders. In area 326 of user interface 300, there can be displayed information on a current article designate for purchase including identifier information, text description of the article, and image e.g. single frame or video information on the article designated for purchase. By selecting box 330 using area 334, a user can specify the vehicle of the customer user which will be used for performance of in-venue pickup and can select box 330 to initiate a request for in-venue pickup of the article that is specified in area 322. In response to a request initiated by selection of box 330 for in-venue pickup, manager system 110 can perform evaluating of loading of the article specified in area 322 into the vehicle specified in area 334. Based on the evaluating, manager system 110 can perform outputting of a notification in area 340. The notification can take on a variety of useful forms e.g. can include the notification "The selected article will not fit in the selected vehicle." In response to a notification that a selected article is not loadable into a selected vehicle the user may then select an alternative vehicle for loading. Various specific information that can be displayed in area 340 can particular instructions for loading the article specified in area 326 into the vehicle specified in area 334.

It has been described in connection with the flowchart of FIG. 2 that manager system 110 can perform various process for automatically populating data repository 112 with data for support of various processes that can be run by manager system 110 such as loading evaluation process 119. Automated data population processes initiated by manager system 110 can be augmented with use of guided data input processes initiated by users such as customer users and enterprise users of system 110. By receiving data for populating data repository 112 in response to action of various individual users of system 100 manager system 110 can be regarded to have performed crowdsourcing data into the data repository 112.

Figure 4:
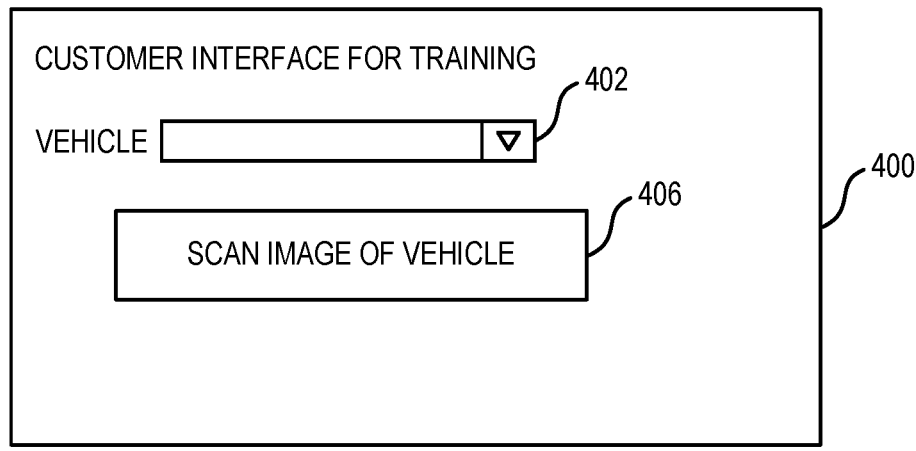
FIG. 4 depicts a user interface for use in crowdsourcing data into a data repository in one embodiment.

FIG. 4 illustrates a user interface 400 for display on a computer device of a customer user e.g. customer user computer device 130A which can be a mobile device. User interface 400 can guide a customer user in entering useful data into data repository 112. User interface 400 can be used to guide entry of dimensional information of a particular vehicle associated to a customer user using area 402, a customer user can designate a vehicle for which additional dimensional information can be entered using user interface 400. Area 402 can include a dropdown menu specifying registered vehicles of a user. Activating scan image of vehicle button 406 a computer device e.g. computer device 130A of a computer user can be activated to scan an image representation of the vehicle specified in area 402. In one embodiment, area 402 can have no vehicle identifier specified and area 402 can be automatically populated for automatic registration of a vehicle on scanning of a vehicle by activation of button 406, e.g. resulting in identification by pattern recognition or decodable indicia decoding such as bar code decoding. In one embodiment, computer device 130A can be configured to include a camera configured to output three-dimensional point cloud image data. On the scanning of image data using a customer user computer device 130A, computer device 130A can automatically upload scanned image data processing by manager system 110. Manager system 110 can extract dimensional information of storage areas of scanned spaces of a vehicle and can store such dimensional information in dimensions area 1122 of data repository 112.

Figure 5:
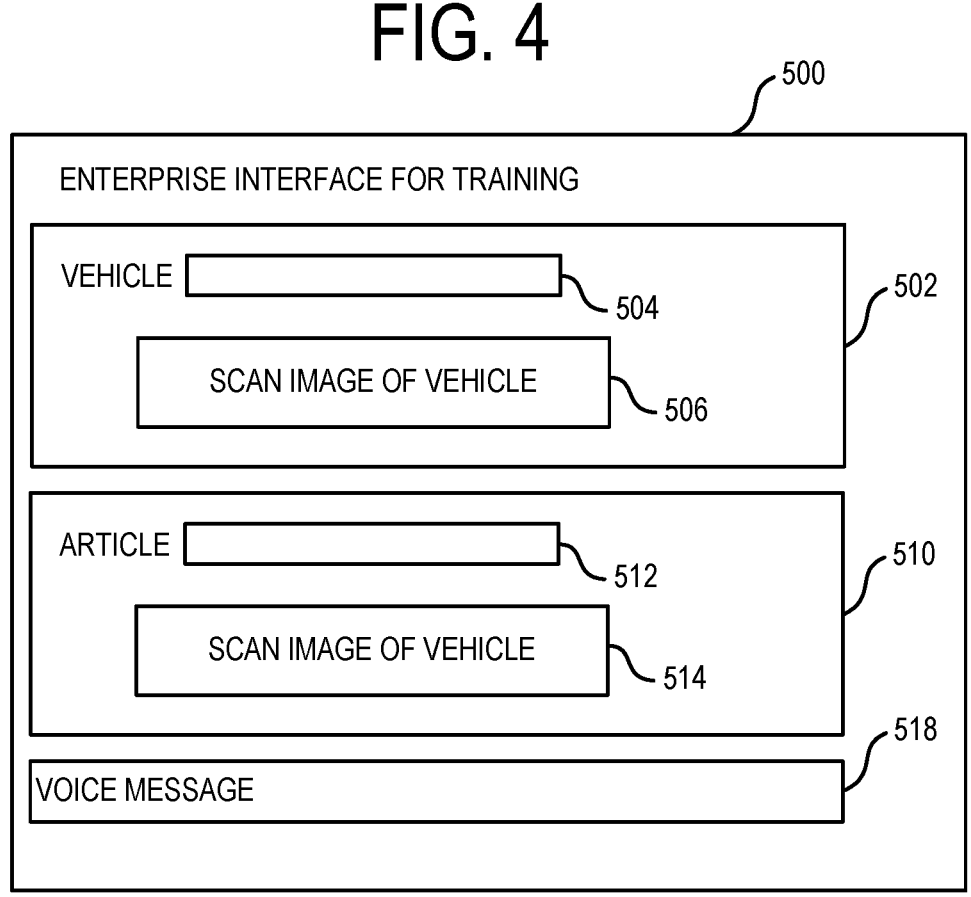
FIG. 5 depicts a user interface for use in crowdsourcing data into a data repository in one embodiment.

FIG. 5 illustrates a user interface 500 for display on a computer device of an enterprise personnel user e.g. computer device 150A which can be a mobile computer device. User interface 500 can guide an enterprise personnel user in entering useful data into data repository 112. An enterprise personnel user can specify in area 504 of vehicle area 502 a vehicle being subject to scanning and by activation of button 506 can activate scanning of a vehicle to obtain image data representing the vehicle including storage areas thereof for accommodation of articles. An enterprise computer device e.g. computer device 150A can be equipped with a camera configured to output three-dimensional point cloud image data from which dimensional information can be readily extracted. In one embodiment, area 504 need not have any identifier specified and such information can be automatically generated by the performance of image scanning activated by activation of button 506, e.g. resulting in identification by pattern recognition or decodable indicia decoding such as bar code decoding. Using area 510 a user can initiate augmenting article information of data repository 112. An enterprise personnel user can specify an article for which additional dimensional information is to be uploaded using area 512. On activation of scan image of article button 514 the computer device of the enterprise user e.g. device 150A can obtain scanned image data of an article. In on embodiment, area 510 can be left blank and automatically populated by the scanning of an article to obtain image data e.g. by the decoding of a barcode included on an article being scanned. The enterprise computer device 150A used for scanning can automatically upload scanned image data to manager system 110, Manager system 110 can extract dimensional information from the image data and can populate the extracted dimensional information into area 1121 of vehicles area and into dimensions area 1130 of articles area 1129. Areas 502 and 510 can be utilized independently by an enterprise personnel user. For example, during a first data upload session the enterprise personnel user may use only area 502 and may be scanning in a fleet of vehicles, and during another unrelated data upload session the enterprise personnel user can use only area 510 and can be scanning in data for a set of differentiated articles.

In another use case however, an enterprise personnel user can be testing the loadability for a particular article into a particular vehicle and can be using a computer device 150A displaying user interface 500 for generating training data for data repository 112 specifically for use by manager system 110 in evaluating loadability of articles according to the particular article into vehicles according to the particular vehicle. System 100 can provide multiple identification labels (specific and general) relating to the particular vehicle and the particular article to for enhancing the usability of the uploaded data. When uploading information on a vehicle in connection with an article, respecting the loadability of the article into the vehicle, an enterprise personnel user can activate button 518 to record an audio message instructing a best practices the loading the article into the vehicle. Enterprise computer device 150A, on the obtaining of such message can automatically upload the message to manager system 110. Manager system can run NLP process 114 to convert the voice-based message into a text-based message, the text-based message with or without the underlying voice data can be stored in instructions area 1123 of data repository 112. The enterprise personnel user can then be prompted to repeat the data training and uploading process using a different article e.g. of a different size and/or a different vehicle e.g. of a different size.

Figure 6:
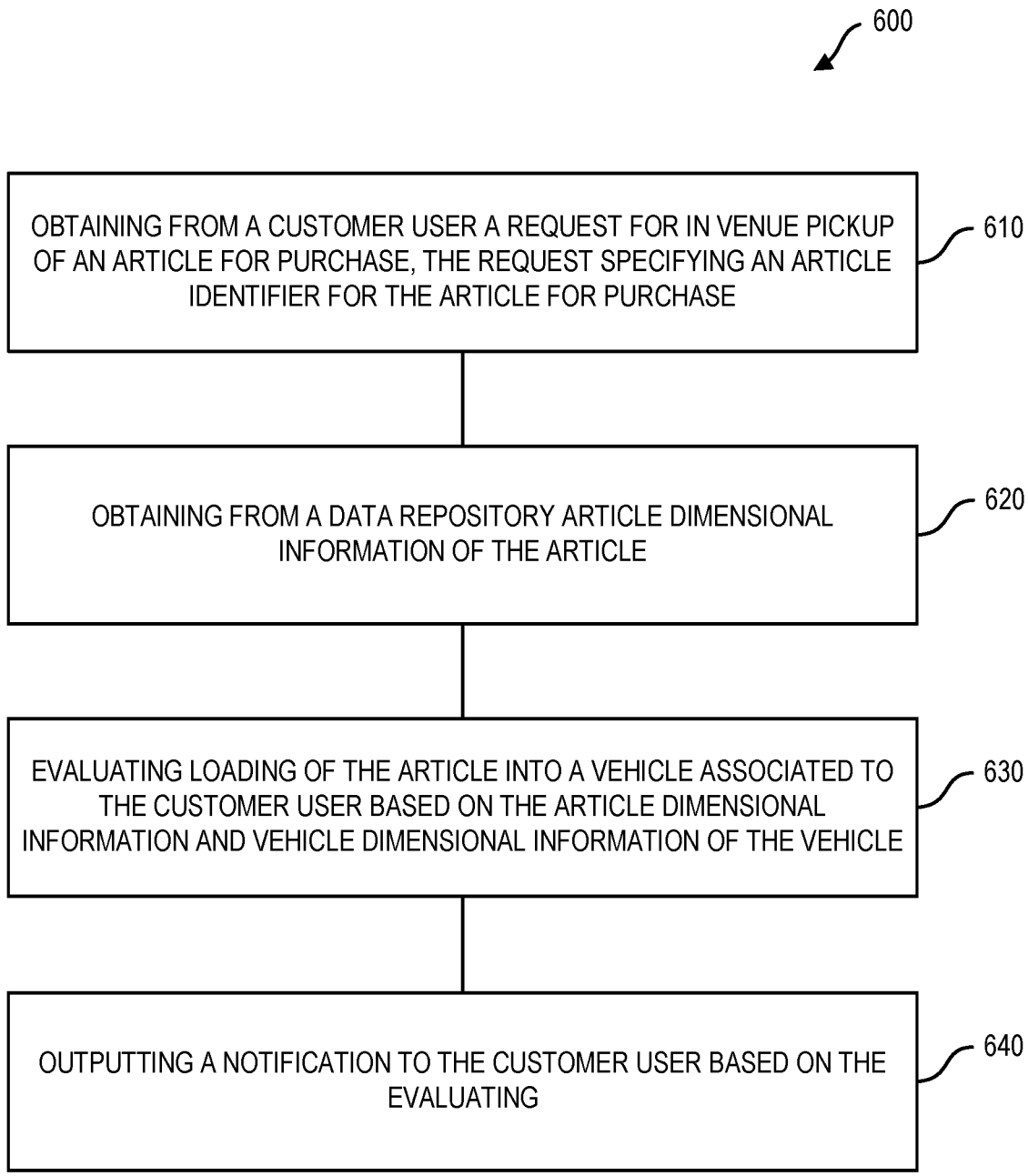
FIG. 6 is a flowchart for use in evaluating loading of an article into a vehicle.

Manager system 110 in one embodiment can perform the method 600 as set forth in FIG. 6. At block 610, manager system 110 can perform obtaining from a customer user a request for in-venue pickup of an article for purchase, the request specifying an article identifier for the article. At block 620 manager system 110 can perform obtaining from data repository 112 dimensional information of the article. Manager system 110 can perform at block 630, evaluating loading of the article into a transport apparatus associated to the customer user based on the article dimensional information and transport apparatus dimensional information of the transport apparatus. At block 640, manager system 110 can perform outputting a notification to the customer user based on the evaluating.

Figure 7:
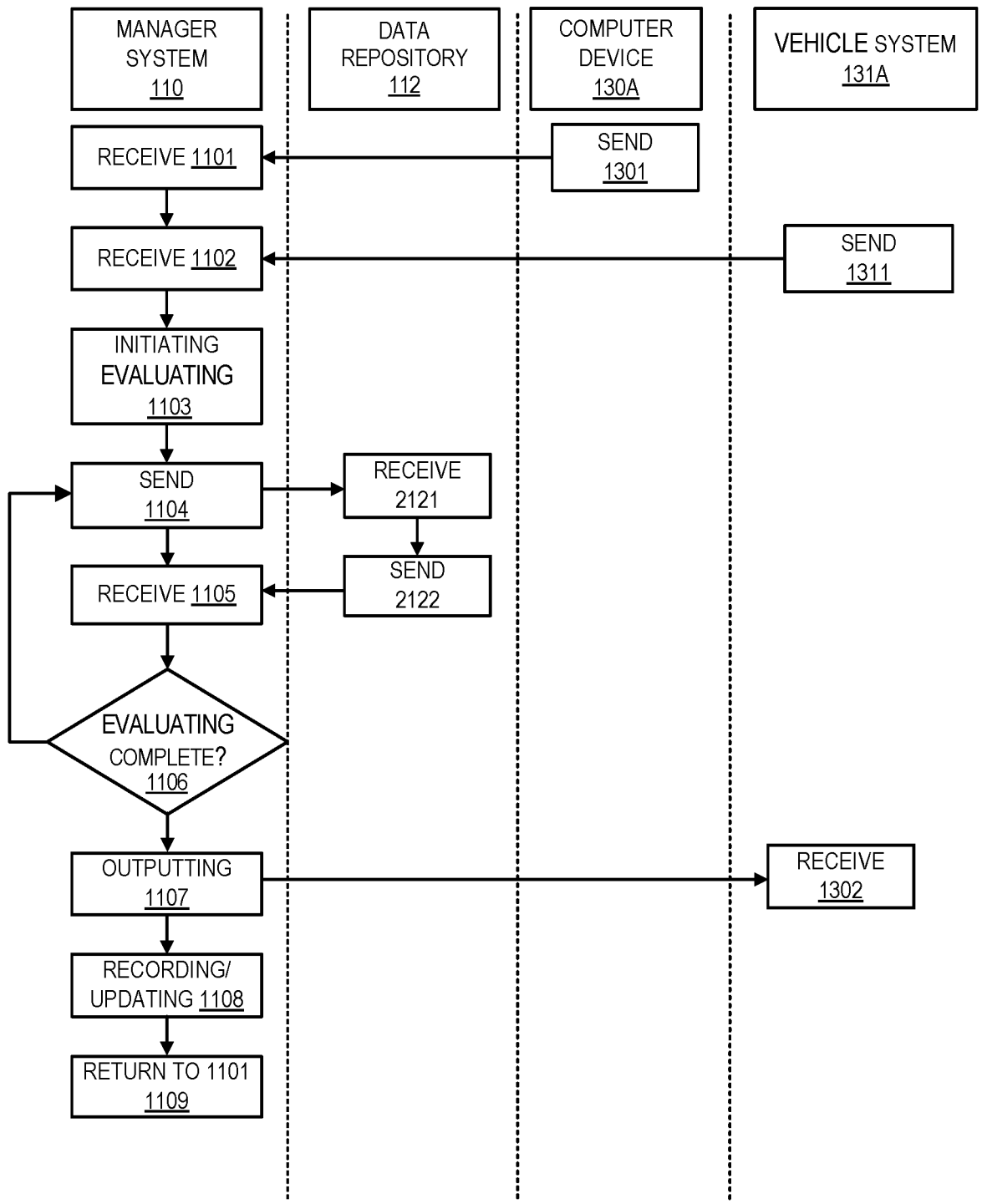
FIG. 7 is a flowchart for use in evaluating loading of an article into a vehicle.

A particular example of manager system 110 performing method 600 is set forth in reference to FIG. 7 illustrating the method for performance by system 110 from the perspective of manager system 110, its associated data repository 112, computer device 130A, and vehicle system 131A.

At block 1301 computer device 130A can send user-defined information for receipt by manager system 110 at block 1101. The customer user-defined information can include a request for in-venue pickup of an article for purchase. At block 1311, vehicle system 131A can send data for receipt by manager system 110 at block 1102. The data received by manager system 110 at block 1102 can include an image representation representing an interior of a vehicle of vehicle system 131A including any article accommodating storage areas thereof. In one embodiment, during performance of block 1301 a user using computer device 130A can be using user interface 300 as set forth in FIG. 3 and vehicle system 131A can be a vehicle system of the vehicle specified in area 334 of user interface 300. On selection of the vehicle in area 334, manager system 110 can establish communication with the vehicle having vehicle system 131A based on registration information associated with registration of the vehicle having vehicle system 131A into manager system 110. Information in area 314 and or area 334 of user interface 300 specifying one or more vehicle of a current user can be specified by manual action of the user using user interface 300 which can be a manually operated user interface. In another example, user vehicle information of area 314 and area 334 can be auto-populated by manager system 110 e.g. by way of manager system requesting information from a social media system (not shown) in communication with manager system and storing various information about a user including on vehicles of the user. A social media system in communication with manager system 110 can include a collection of files, including for example, HTML files, CSS files, image files, and JavaScript files. Social media system 120 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC).

At block 1103 manager system 110 can initiate evaluating the loading of an article designated for purchase into a specified vehicle. Referring to user interface 300 of FIG. 3 the article can be the article specified in area 322 and the vehicle can be the vehicle specified in area 334. The sending of information at block 1301 can be initiated by a user selecting box 330 to initiate an in-venue pickup request. For performing and evaluating, manager system 110 can make multiple requests for data on data repository 112, such data requests are represented by block 1104 for receipt by data repository 112 at block 2121. On receipt of a data request at block 2121, data repository 112 at block 2122 send data to manager system 110 as indicated by send block 2122 for receipt by manager system 110 at block 1105. For performing data requests at block 1105 can use the article identifier specified in area 326 and the vehicle identifier specified in area 334 to key data requests from records stored in data repository 112 which can store article records indexed by article identifiers (specific and/or general) and vehicle records indexed by vehicle records (specific and/or general). On receipt of data from data repository 112 at block 1105 manager system 110 can perform processing of received data at block 1105. At block 1106, manager system 110 can complete evaluating of loading and can and determine whether evaluating information is complete and if loading evaluating is complete can proceed to block 1107 to perform outputting at block 1107. Outputting at block 1107 can include outputting a notification to a user.

Evaluating the loading of an article into a vehicle can include use of data received by manager system 110 at block 1101 from computer device 130A and block 1102 from vehicle system 131A, as well as data received from data repository 112 at block 1105. As indicated by block 1106, manager system 110 can make multiple requests for data on data repository 112 until evaluating of loading of an article into a vehicle is complete. For performing evaluating at blocks 1103-1106, manager system 110 can compare dimensional information specifying dimensions of an article to dimensional information specifying dimensions of a vehicle. In performing evaluating at blocks 1103-1106 manager system 110 can determine by computing article dimensions to vehicle dimensions whether there are any conflicting dimensions between the article dimension and the vehicle dimensions e.g. whether there is one or more vehicle dimension based on one or more vehicle dimension that prevents an article from being fitted into a storage area of the vehicle. In performing evaluating at blocks 1103-1106 manager system 110 can run a 3D bin packing process based on available dimensional information of the current article and current vehicle. A 3D bin backing process can resolve defined NP complete bin packing problems. Exact solutions to NP complete problems can be computationally intensive and thus a 3D bin packing algorithm process can feature use of heuristics for reduced computational complexity, e.g. approximations such as the best fit decreasing algorithm and the first fit decreasing algorithm. For use of a 3D bin packing process manager system 110 can define bin inputs into a 3D bin packing process based on vehicle dimensional information looked up from area 1122 of data repository 112 and object inputs into a 3D bin packing process based on vehicle dimensional information looked up from area 1122 of data repository 112. Manager system 110 in some iterations of performing evaluating at blocks 1103-1106 can determine that an article is not loadable into a current vehicle. In some instances manager system 110 in performing evaluating at blocks 1103-1106 can determine that a current article would have been loadable into a vehicle but that the vehicle, based on examination of image data received from vehicle system 131A at block 1102 currently is loaded with one or more object interfering with loading of the article, such that loading of the article is prevented.

In one embodiment for highlighting features an article is specified in area 326 of user interface 300 an identifier for article is sent at block 1301 and manager system 110 at blocks 1103-1106 performs loading evaluating with respect to an article. It will be understood that in one embodiment, one or more article (e.g. 1 to N articles, N>1) can be specified in area 326 of user interface 300 an identifier for one or more article can be sent at block 1301 based on user defined data and manager system 110 at blocks 1103-1106 can perform loading evaluating with respect to one or more article. Manager system 110 at blocks 1103-1106 for performing evaluating with respect to more than one article that can be specified in area 322 of user interface 300 can define more than one object input into a 3D bin packing process run by manager system 110 as art of loading evaluation process 119. Each of the more than one input can include dimensional information for an article specified in area 322 of user interface 300.

At block 1107 on the completion of an evaluating, manager system 110 can perform outputting. The outputting can include outputting of the notification. Outputting of a notification can include outputting of a notification for receipt by computer device 130A at block 1302. The outputting can be performed in one embodiment by outputting a notification to user interface 300 which in one embodiment can be provided by a webpage-based user interface served by a server of manager system 110 for viewing by client computer devices such as computer device 130A. Manager system 110 can provide alternative notifications in addition or in the alternative e.g. via text message using a text message messaging system, a posting on a social network, an e-mail, and the like. The notification subject to outputting at block 1107 by manager system 110 can include a message containing a variety of useful information. In one embodiment the notification can include specific instructions as to how the current article, e.g. the article specified in area 326 of user interface 300 of FIG. 3 can be loaded into the current vehicle as specified in area 334 of a user interface 300 as shown in FIG. 3. Manager system 110 can look up such specific instructions using a current vehicle identifier and/or article identifier from instructions area 1123 and/or article instructions area 1131.

Manager system 110 for performing of evaluating at blocks 1103-1106 e.g. responsively to determining that a current article is not loadable into a current vehicle manager system 110 can also lookup information from data repository 112 to determine identifiers e.g. specific identifiers and or general identifiers for vehicles suitable for loading with the current article. For providing such functionality, manager system 110 for performing evaluating at blocks 1103-1106 can compare article information of a current article to vehicle dimensional information stored in records of repository 112 for vehicles in addition to the current vehicle and can accordingly flag vehicle identifiers of vehicles having sufficient sized storage areas to accommodate the current article. Manager system 110 having functionality to locate alternate vehicles for accommodating an article can display in notification area 340 of user interface 300 identifiers e.g. vehicle makes and years, of alternate vehicles suitable for accommodating loading of the current article. The current user, based on such information, can gain access to one of the specified vehicle types (e.g. a family member or friend or vehicle rental agency may have possession of such vehicle) and can register a vehicle suitable for accommodating loading using area 314.

Machine learning processes are described with reference to block 1108 of the flowchart of block 7. At block 1108, manager system 110 can perform examining and recording of results obtained by performing of a loading evaluating e.g. at blocks 1103-1106, and further at block 1108 manager system updating of data repository 112 based on the examining. For examining results obtained with use of a prior loading evaluations determined by manager system 110, manager system 110 can examine camera image data provided by venue system 140. Venue system 140 in one embodiment can be obtaining camera image data from a camera of venue system 140 that is operative for obtaining image data representing live in-venue pickups by prior users. A camera associated with venue system 140 as shown in FIG. 1 can be oriented to obtain image data representing a live loading of an article into a vehicle at loading area 146 of retail venue 142. Manager system 110 at block 1108 can examine image data representing a loading of an article into a vehicle. Manager system 110 can be configured so that manager system 110 automatically examines image data representing a vehicle loading area 146, the image data being automatically obtained by manager system 110 using a camera of venue system 140. Manager system 110 in one embodiment can perform each of blocks 1101-1107 automatically in real time (e.g. with only processing delay and/or without user perceivable delay) and responsively to a performing of a preceding block.

In one embodiment manager system 110 can perform examining at block 1108 for examining a result of evaluating at blocks 1103-1106 a time after performing outputting at block 1107 to account for travel time of the current user to a venue but that manager system 110 can be performing examining recording an updating at block 1108 for a prior iteration of evaluating at blocks 1103-1106 e.g. for another user at a time of outputting at block 1107 (which can occur in real time with no user perceivable delay in response to completion of evaluating at block 1106) and that manager system 110 can concurrently be performing the loop of blocks 1101-1109 iteratively for multiple users at all times until termination.

Manager system 110 at block 1108 can examine camera image data obtained by venue system 140 and can recognize based on an image data analysis whether an article, contrary to the prior prediction performed by manager system 110 by the evaluating at block 1103-1106, is in fact not loadable into a vehicle. Manager system 110 can perform updating of data of data repository 112 based on such an examination result (article not loading) in a variety of ways, and by the updating of data repository 112 can modify performing of evaluating by manager system 110 during a next iteration of manager system 110 of performing evaluating at block 1103-1106.

Based on an examining of image data representing live loading at block 1108 resulting in a determination that a prior positive evaluating of loading is incorrect, manager system 110 in one embodiment can purge records from data repository 112, for example the records in area 1122 and/or 1130 determined to yield the incorrect loading evaluating. Dimensional information for specific vehicles and specific articles can differ slightly between records particularly since the records can be generated from multiple sources (e.g. publicly available database, supplier data, user initiated data). Based on an examining of image data representing live loading at block 1108 resulting in a determination that a prior positive evaluating of loading is incorrect, manager system 110 in one embodiment can purge records from data repository 112, for example the records in area 1122 indicating the largest dimensional information for a certain vehicle for which there are multiple records, and/or for example the records in area 1130 indicating the smallest dimensional information for a certain article for which there are multiple records.

Based on an examining of image data representing live loading at block 1108 resulting in a determination that a prior positive evaluating of loading is incorrect, manager system 110 in one embodiment can modify dimensional information of records from data repository 112, for example dimensional information of the records in area 1122 and/or 1130 determined to yield the incorrect loading evaluating. In such an embodiment, manager system 110 can decrease dimensions of dimensional information of one or more vehicle record for the current vehicle, and manager system 110 can increase dimensions of dimensional information of one or more article record for the current article so that during a next iteration of an evaluating at blocks 1103-1106 manager system 110 with the same article-vehicle combination manager system 110 can correctly perform loading evaluating to correctly predict that the article is not loadable.

Based on an examining of image data representing live loading at block 1108 resulting in a determination that a prior positive evaluating of loading is incorrect, manager system 110 in one embodiment can update an invalid combinations lists that specifies combinations of articles and vehicles that are invalid. Manager system 110 can maintain in data repository 112 such invalid combinations list. Manager system 110 can be configured so that manager system 110 for performing evaluating at blocks 1103-1106 examines the invalid combinations list, and if the current combination is on the invalid combinations list manager system 110 determines that the article is unloadable irrespective of whether a comparing of dimensional information for the article and vehicle indicated that the article is loadable. By updating an invalid combinations list of data repository 112 at block 1108 manager system 110 adjust performing of a next iteration of evaluating by manager system 110 (which now for a next iteration of evaluating will consult an updated invalid combinations list). Use of machine learning processes as set forth in reference to block 1108 can enhance accuracy while reducing reliance on rules based criteria for decision making and thus can provide for reductions in computational overhead. Embodiments herein recognize that because of computational complexities associated with volumetric geometries, management of computational overhead can be of fundamental concern with respect to many embodiments herein. On completion of block 1108 manager system 110 can proceed to return block 1109 and return to block 1101.

Certain embodiments herein may offer various technical computing advantages, involving computing advantages to address problems arising in the realm of computer networks such as managing of computational overhead problems resulting from processing of data representing multidimensional objects. In one embodiment, machine learning processes can be performed for increased accuracy and for reduction of reliance on rules based criteria and thus reduced computational overhead. In one embodiment, a data repository can be leverages which can be populated and managed by multiple processes including proactive data populating process invoking search engines searching of public databases and reactive data populating processes reliant on initiation of input data by enterprise personnel users and customer users using user computer devices. For enhancement of computational accuracies, embodiments can feature computational platforms existing only in the realm of computer networks such as artificial intelligence platforms, machine learning platforms and crowdsourcing platforms wherein crowdsourcing platforms can be used to facilitate collection of rich data from a plurality of users who can include enterprise users and customer users. Embodiments herein can employ data structuring processes, e.g. employing relationship graphs for structuring data to transform unstructured data optimized for human processing into a form optimized for computerized processing. Embodiments herein can provide results and advantages that are not possible or practical without use of components of a technical computing environment, such as providing for practical addressing of computationally complex three dimensional space problems with use of such platforms as machine learning and heuristics. Embodiments herein can include artificial intelligence processing platforms featuring improved processes to transform unstructured data into structured form permitting computer based analytics and predictive decision making. Embodiments herein can include particular arrangements for both collecting rich data into a data repository and additional particular arrangements for updating such data and for use of that data to drive artificial intelligence decision making. Embodiments herein can include arrangements to collect data form a variety of data sources such as external systems, website hosting servers and camera equipped computer devices for output of image data representing three dimensional objects. Embodiments herein can include deploying a camera for monitoring a location and to output image data representing live vehicle loading and to drive machine learning processes based on the monitoring.

Figure 8:
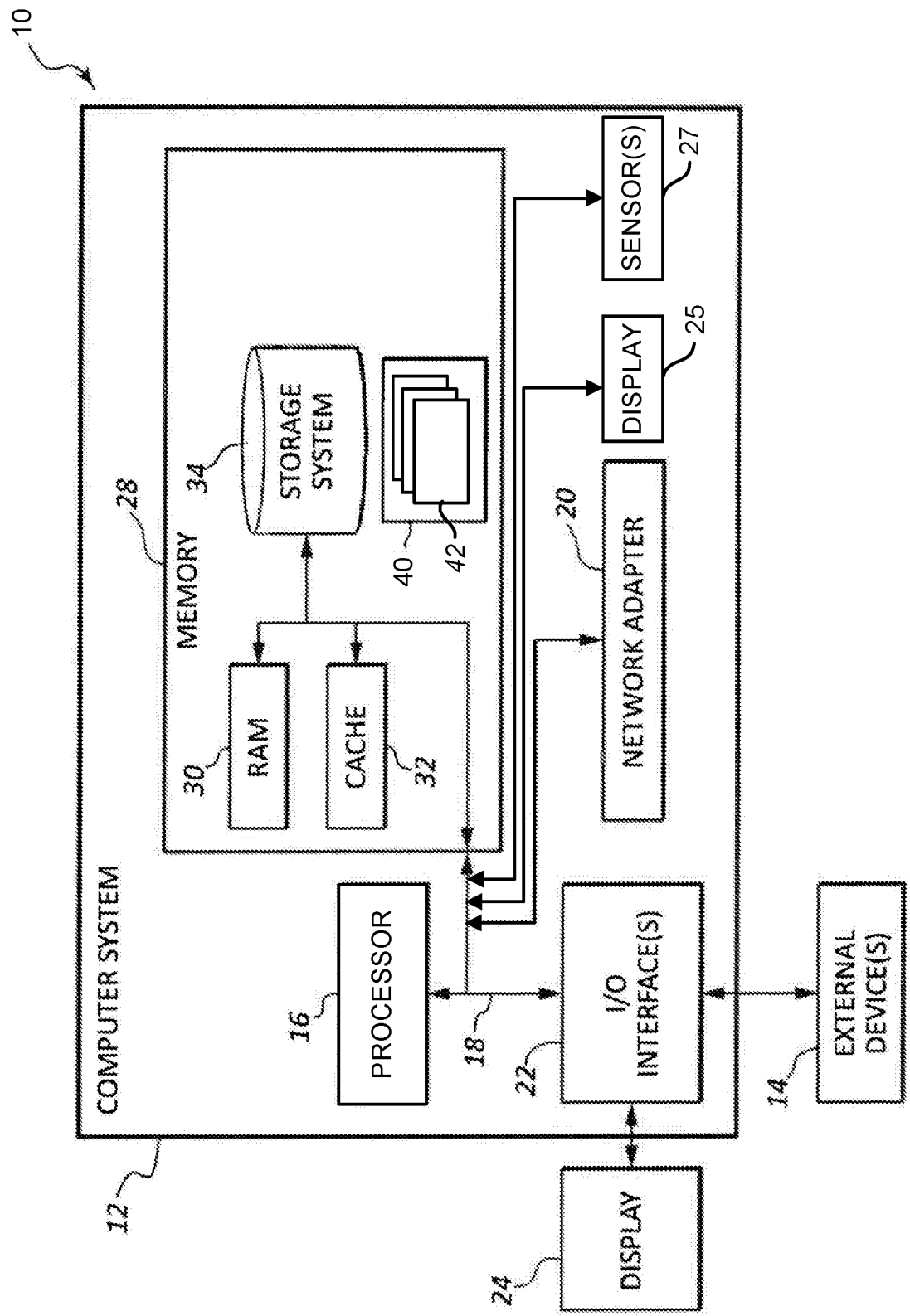
FIG. 8 depicts a computing node according to one embodiment.
Figure 9:
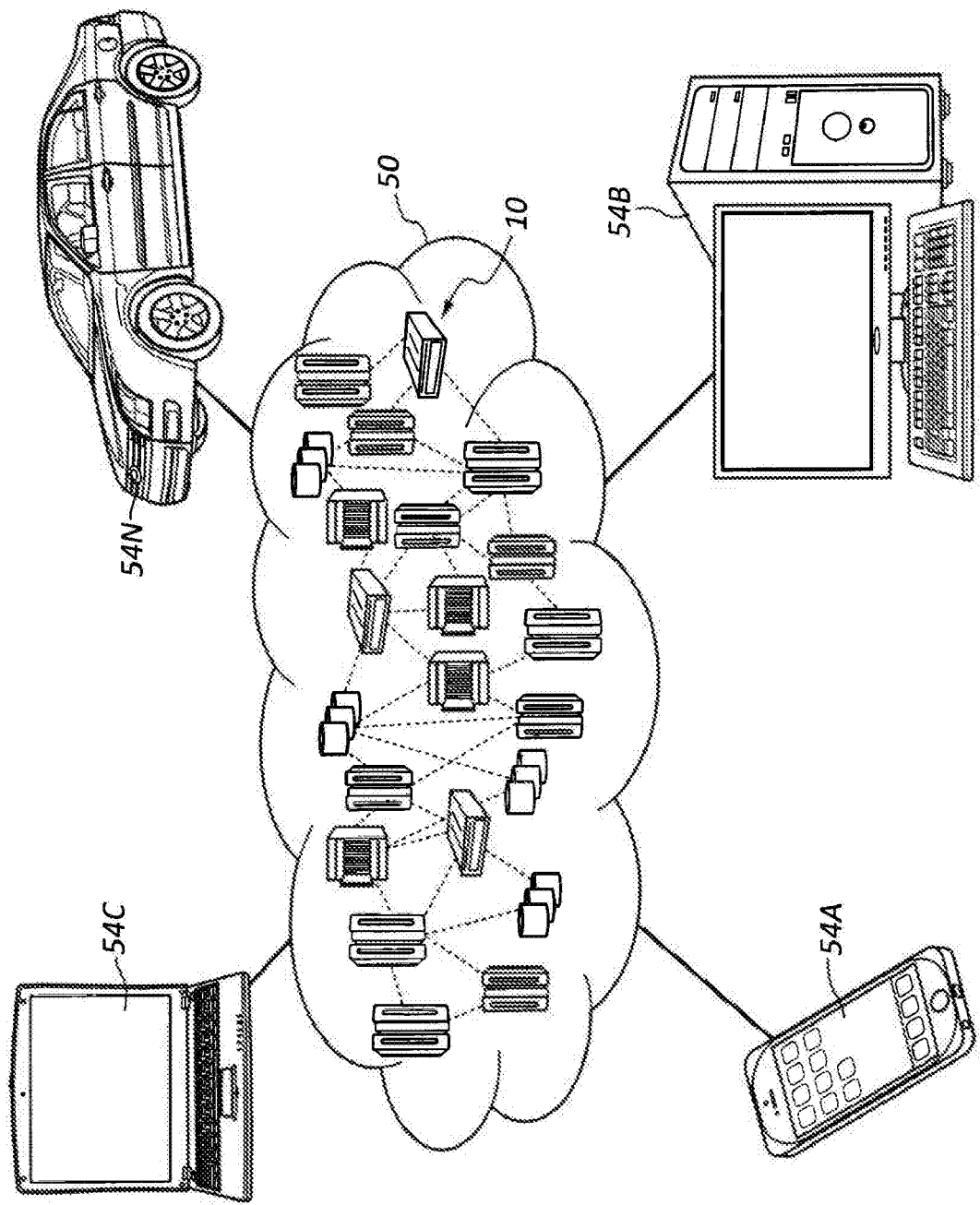
FIG. 9 depicts a cloud computing environment according to one embodiment.
Figure 10:
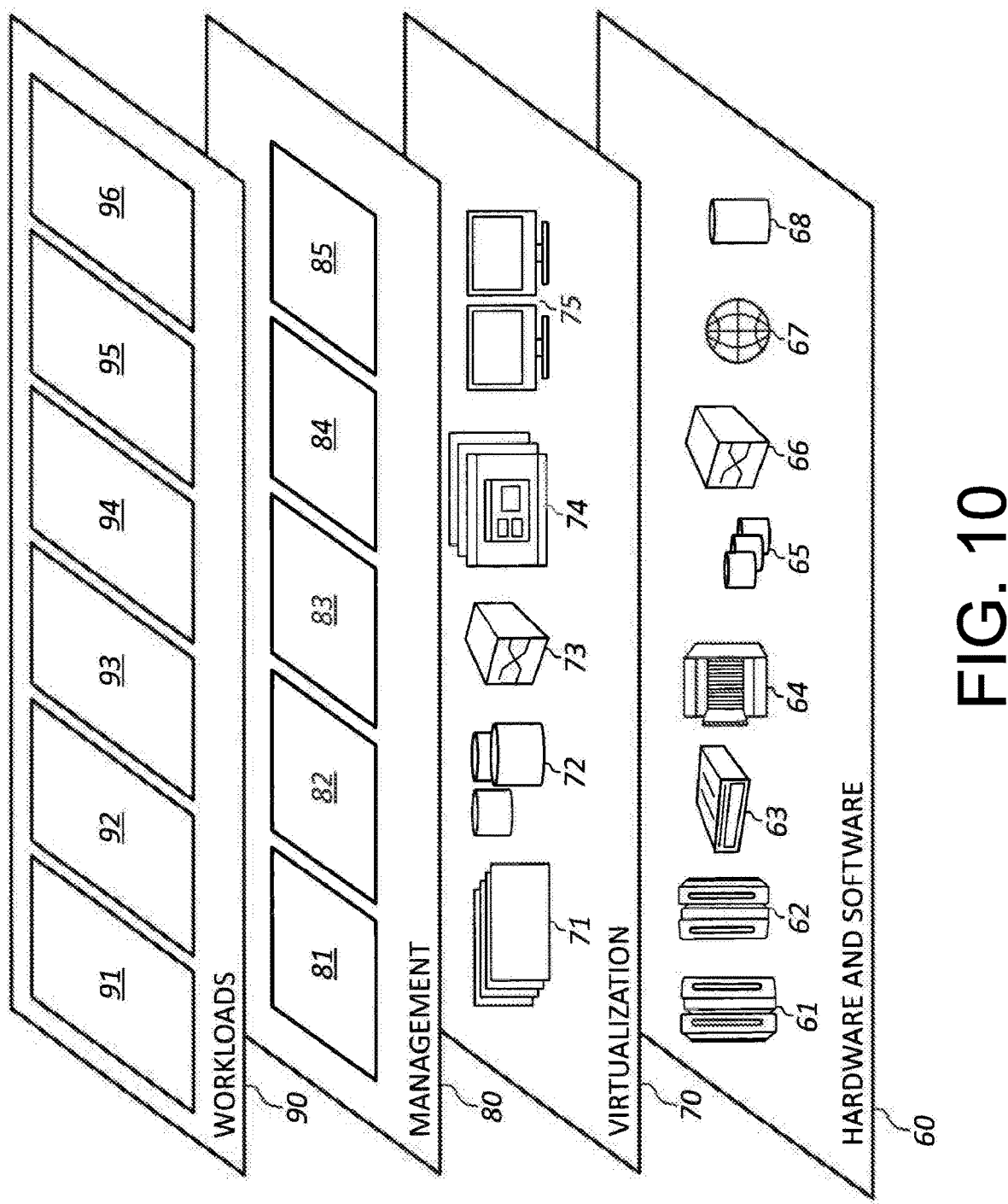
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and for performing functions described with reference to method 600 of FIG. 6, and functions described with reference to manager system 110 as set forth in the flowchart of FIG. 7. In one embodiment, one or more user computer device 130A-130Z can include one or more computing node 10 and can include one or more program 40 for performing functions described with reference to one or more user computer device 130A as set forth in the flowchart of FIG. 7. In one embodiment, one or more vehicle system 131A-131Z can include one or more computing node 10 and can include one or more program 40 for performing functions described with reference to one or more vehicle system 131A as set forth in the flowchart of FIG. 7.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. In one embodiment one or more sensor device 27 can include a camera configured to output three dimensional (3D) point cloud image data. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for loading evaluating as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining a request for in venue pickup of an article by a customer user, the request specifying an article identifier for the article;
    obtaining from a data repository article dimensional information of the article;
    evaluating loading of the article into a transport apparatus associated to the customer user based on the article dimensional information and transport apparatus dimensional information of the transport apparatus; and
    outputting a notification to the customer user based on the evaluating, wherein the obtaining the request for in venue pickup includes obtaining data that specifies a request for in venue pickup of an article by a customer user, the request specifying an article identifier for the article and a transport apparatus to be used by the customer user in performing the in venue pickup, wherein the customer user at a time of the obtaining the request is located a travel distance away from a venue at which the in venue pickup is to be performed, wherein the obtaining from a data repository article dimensional information of the article includes obtaining from the data repository in response to input data that specifies the request for in venue pickup of the article dimensional information of the article and dimensional information of the transport apparatus, receiving articles image data representing articles of a plurality of articles responsively to initiations of a data uploads initiated by individual enterprise users associated to the venue using manually operated user interfaces of respective mobile computer devices of the individual enterprise users, and receiving transport apparatus image data representing transport apparatus of a plurality of transport apparatus responsively to initiations of a data uploads initiated by individual enterprise users associated to the venue using manually operated user interfaces of respective mobile computer devices of the individual enterprise users.

2. The computer implemented method of claim 1, wherein the obtaining the request for in venue pickup includes obtaining through a web page based user interface input data that specifies a request for in venue pickup of an article by a customer user, wherein the customer user at a time of the obtaining the request is located a travel distance away from a venue at which the in venue pickup is to be performed.

3. The computer implemented method of claim 1, wherein the evaluating includes looking up data from a data repository, wherein the method includes performing a machine learning process to monitor a result of the evaluating, wherein the machine learning process to monitor includes examining image data representing live loading of the article being loaded into the transport apparatus, wherein the method includes as a result of the machine learning process to monitor determining that the article is in fact not loadable into the transport apparatus, and responsively to the determining that the article is in fact not loadable into the transport apparatus modifying a subsequent iteration of evaluating.

4. The computer implemented method of claim 1, wherein the method includes performing a machine learning process to monitor a result of the evaluating, wherein the machine learning process to monitor includes examining image data representing live loading of the article being loaded into the transport apparatus, wherein the method includes as a result of the examining modifying a subsequent iteration of evaluating.

5. The computer implemented method of claim 1, wherein the data repository includes a plurality of records for the transport apparatus, wherein the method includes performing a machine learning process to monitor a result of the evaluating, and modifying a subsequent iteration of evaluating based on the monitoring, wherein the machine learning process to monitor includes examining camera image data representing live loading of the article being loaded into the transport apparatus, wherein the method includes as a result of the evaluating determining that the article is loadable into the transport apparatus, wherein the method includes as a result of the machine learning process to monitor determining that the article is in fact not loadable into the transport apparatus, and wherein the modifying a subsequent iteration of evaluating includes updating data of the data repository, wherein the updating includes purging a record of the plurality of records specifying largest dimensional information for the transport apparatus.

6. The computer implemented method of claim 1, wherein the method includes performing a machine learning process to monitor a result of the evaluating, wherein the machine learning process to monitor includes monitoring live loading of the article into the transport apparatus, wherein the method includes modifying a subsequent iteration of evaluating based on the monitoring, wherein the modifying a subsequent iteration of evaluating includes updating data of the data repository, wherein the updating includes changing dimensional information stored within the data repository.

7. The computer implemented method of claim 1, wherein the obtaining the request for in venue pickup includes obtaining through a web page based user interface input data that specifies a request for in venue pickup of an article by a customer user, wherein the data repository stores information on dimensions of a plurality of articles and information on dimensions of a plurality of transport apparatus, the plurality of articles including the article, the plurality of transport apparatus including the transport apparatus.

8. The computer implemented method of claim 1, wherein the obtaining the request for in venue pickup includes obtaining through a web page based user interface input data that specifies a request for in venue pickup of an article by a customer user, wherein the data repository stores information on dimensions of a plurality of articles and information on dimensions of a plurality of transport apparatus, the plurality of articles including the article, the plurality of transport apparatus including the transport apparatus, wherein the evaluating includes looking up data from the data repository, wherein the method includes populating the data repository, wherein the populating the data repository includes crowdsourcing data from a plurality of users, wherein the crowdsourcing includes collecting scanned image data representing a plurality of different transport apparatus from mobile computer devices associated to a plurality of different customer users.

9. The computer implemented method of claim 1, wherein the obtaining the request for in venue pickup includes obtaining through a web page based user interface input data that specifies a request for in venue pickup of an article by a customer user, wherein the data repository stores information on dimensions of a plurality of articles and information on dimensions of a plurality of transport apparatus, the plurality of articles including the article, the plurality of transport apparatus including the transport apparatus, wherein the method includes performing a machine learning process to monitor a result of the evaluating, and modifying a subsequent iteration of evaluating based on the monitoring, wherein the machine learning process to monitor includes examining camera image data representing live loading of the article being loaded into the transport apparatus at the location of the pickup.

10. The computer implemented method of claim 1, wherein the obtaining the request for in venue pickup includes obtaining through a web page based user interface input data that specifies a request for in venue pickup of an article by a customer user, wherein the data repository stores information on dimensions of a plurality of articles and information on dimensions of a plurality of transport apparatus, the plurality of articles including the article, the plurality of transport apparatus including the transport apparatus, wherein the method includes populating the data repository, wherein the populating the data repository includes performing search engine processes to search for data from external data sources to receive from external data sources dimensional information for articles of the plurality of articles and dimensional information for transport articles of the plurality of articles, obtaining image data representing transport apparatus of the plurality of transport apparatus responsively to initiations of data uploads initiated by individual customer users using a manually operated user interfaces of respective mobile computer devices of the individual customer users.

11. The computer implemented method of claim 1, wherein the obtaining the request for in venue pickup includes obtaining through a web page based user interface input data that specifies a request for in venue pickup of an article by a customer user, wherein the data repository stores information on dimensions of a plurality of articles and information on dimensions of a plurality of transport apparatus, the plurality of articles including the article, the plurality of transport apparatus including the transport apparatus, wherein the evaluating loading includes performing evaluating, using a 3D bin packing process, loading of the article into a second transport apparatus, the second transport apparatus not associated to the customer user at a time of the evaluating, and wherein the outputting a notification includes outputting a notification that includes an identifier of one or more alternate transport apparatus determined as a result of performing the 3D bin packing process to accommodate loading of the article.

12. The computer implemented method of claim 1, wherein the obtaining the request for in venue pickup includes obtaining through a web page based user interface input data that specifies a request for in venue pickup of an article by a customer user, wherein the data repository stores information on dimensions of a plurality of articles and information on dimensions of a plurality of transport apparatus, the plurality of articles including the article, the plurality of transport apparatus including the transport apparatus, wherein the method includes populating the data repository, wherein the populating the data repository includes performing search engine processes to search for data from external data sources to receive from external data sources dimensional information for articles of the plurality of articles and dimensional information for transport articles of the plurality of articles, obtaining image data representing transport apparatus of the plurality of transport apparatus responsively to initiations of data uploads initiated by individual customer users using a manually operated user interfaces of respective mobile computer devices of the individual customer users, wherein the evaluating loading includes performing evaluating, using a 3D bin packing process, loading of the article into a second transport apparatus, the second transport apparatus not associated to the customer user at a time of the evaluating, and wherein the outputting a notification includes outputting a notification that includes an identifier of one or more alternate transport apparatus determined as a result of performing the 3D bin packing process to accommodate loading of the article, wherein the data repository includes a plurality of article records for the article, and a plurality of transport apparatus records for the transport apparatus, wherein the method includes performing a machine learning process to monitor a result of the evaluating, and modifying a subsequent iteration of evaluating based on the monitoring, wherein the machine learning process to monitor includes examining camera image data representing live loading of the article being loaded into the transport apparatus at a location of the in venue pickup, wherein the method includes as a result of the evaluating determining that the article is loadable into the transport apparatus, wherein the method includes as a result of the machine learning process to monitor determining that the article is in fact not loadable into the transport apparatus, and wherein the modifying a subsequent iteration of evaluating includes updating data of the data repository, wherein the updating includes purging a record of the plurality of records specifying smallest dimensional information for the article, and wherein the updating includes purging a record of the plurality of records specifying largest dimensional information for the transport apparatus, wherein the updating includes changing dimensional information stored within the data repository, wherein the dimensional information is selected from the group consisting of (a) dimensional information for the article, and (b) dimensional information for the transport apparatus, wherein the evaluating includes examining an invalid combinations list that specifies invalid combinations of articles and transport apparatus wherein specified articles do not fit into specified transport articles, and wherein the updating the data repository includes updating the invalid combinations list to specify on the invalid combinations list that that the article does not fit into the transport apparatus.

13. The computer implemented method of claim 1, wherein the method includes obtaining input data that specifies a request for in venue pickup of an article by a customer user, wherein the data repository stores information on dimensions of a plurality of articles and information on dimensions of a plurality of transport apparatus.

14. The computer implemented method of claim 1, wherein the method includes obtaining input data that specifies a request for in venue pickup of an article by a customer user, wherein the data repository stores information on dimensions of a plurality of articles and information on dimensions of a plurality of transport apparatus, the plurality of articles including the article, the plurality of transport apparatus including the transport apparatus, populating the data repository, wherein the populating the data repository includes performing search engine processes to search for data from external data sources to receive from external data sources dimensional information for articles of the plurality of articles and dimensional information for transport articles of the plurality of articles, obtaining image data representing transport apparatus of the plurality of transport apparatus responsively to initiations of data uploads initiated by individual customer users.

15. A computer program product comprising:
a computer readable storage medium readable by one or more processing circuit and storing instructions for execution by one or more processor for performing a method comprising:
obtaining a request for in venue pickup of an article by a customer user, the request specifying an article identifier for the article;
obtaining from a data repository article dimensional information of the article;
evaluating loading of the article into a transport apparatus associated to the customer user based on the article dimensional information and transport apparatus dimensional information of the transport apparatus; and
outputting a notification to the customer user based on the evaluating, wherein the obtaining the request for in venue pickup includes obtaining data that specifies a request for in venue pickup of an article by a customer user, the request specifying an article identifier for the article and a transport apparatus to be used by the customer user in performing the in venue pickup, wherein the customer user at a time of the obtaining the request is located a travel distance away from a venue at which the in venue pickup is to be performed, wherein the obtaining from a data repository article dimensional information of the article includes obtaining from the data repository in response to input data that specifies the request for in venue pickup of the article dimensional information of the article and dimensional information of the transport apparatus, receiving articles image data representing articles of a plurality of articles responsively to initiations of a data uploads initiated by individual enterprise users associated to the venue using manually operated user interfaces of respective mobile computer devices of the individual enterprise users, and receiving transport apparatus image data representing transport apparatus of a plurality of transport apparatus responsively to initiations of a data uploads initiated by individual enterprise users associated to the venue using manually operated user interfaces of respective mobile computer devices of the individual enterprise users.

16. A system comprising:
a memory;
at least one processor in communication with the memory; and
program instructions executable by one or more processor via the memory to perform a method comprising:
obtaining a request for in venue pickup of an article by a customer user, the request specifying an article identifier for the article;
obtaining from a data repository article dimensional information of the article;
evaluating loading of the article into a transport apparatus associated to the customer user based on the article dimensional information and transport apparatus dimensional information of the transport apparatus; and
outputting a notification to the customer user based on the evaluating, wherein the obtaining the request for in venue pickup includes obtaining data that specifies a request for in venue pickup of an article by a customer user, the request specifying an article identifier for the article and a transport apparatus to be used by the customer user in performing the in venue pickup, wherein the customer user at a time of the obtaining the request is located a travel distance away from a venue at which the in venue pickup is to be performed, wherein the obtaining from a data repository article dimensional information of the article includes obtaining from the data repository in response to input data that specifies the request for in venue pickup of the article dimensional information of the article and dimensional information of the transport apparatus, receiving articles image data representing articles of a plurality of articles responsively to initiations of a data uploads initiated by individual enterprise users associated to the venue using manually operated user interfaces of respective mobile computer devices of the individual enterprise users, and receiving transport apparatus image data representing transport apparatus of a plurality of transport apparatus responsively to initiations of a data uploads initiated by individual enterprise users associated to the venue using manually operated user interfaces of respective mobile computer devices of the individual enterprise users.

17. The system of claim 16, wherein the obtaining the request for in venue pickup includes obtaining through a web page based user interface input data that specifies a request for in venue pickup of an article by a customer user, wherein the data repository stores information on dimensions of a plurality of articles and information on dimensions of a plurality of transport apparatus, the plurality of articles including the article, the plurality of transport apparatus including the transport apparatus.

18. The system of claim 16, wherein the evaluating includes looking up data from the data repository, wherein the method includes populating the data repository, wherein the populating the data repository includes crowdsourcing data from a plurality of users, wherein the crowdsourcing includes collecting scanned image data representing a plurality of different transport apparatus from mobile computer devices associated to a plurality of different customer users.

19. The system of claim 16, wherein the method includes populating the data repository, wherein the populating the data repository includes performing search engine processes to search for data from external data sources to receive from external data sources dimensional information for articles of the plurality of articles and dimensional information for transport articles of the plurality of articles, obtaining image data representing transport apparatus of the plurality of transport apparatus responsively to initiations of data uploads initiated by individual customer users using a manually operated user interfaces of respective mobile computer devices of the individual customer users.

20. The system of claim 16, wherein the evaluating loading includes performing evaluating, using a 3D bin packing process, loading of the article into a second transport apparatus, the second transport apparatus not associated to the customer user at a time of the evaluating, and wherein the outputting a notification includes outputting a notification that includes an identifier of one or more alternate transport apparatus determined as a result of performing the 3D bin packing process to accommodate loading of the article.

* * * * *